United States Patent
Ghaisas et al.

(10) Patent No.: US 10,146,762 B2
(45) Date of Patent: Dec. 4, 2018

(54) AUTOMATED CLASSIFICATION OF BUSINESS RULES FROM TEXT

(71) Applicant: TATA CONSULTANCY SERVICES LIMITED, Mumbai, Maharashtra (IN)

(72) Inventors: Smita Ghaisas, Pune (IN); Manish Motwani, Pune (IN); Preethu Rose Anish, Pune (IN); Shashi Kant Sharma, Pune (IN)

(*) Notice: Subject to any disclaimer, the term of this patent is extended or adjusted under 35 U.S.C. 154(b) by 417 days.

(21) Appl. No.: 13/778,850

(22) Filed: Feb. 27, 2013

(65) Prior Publication Data

US 2014/0244241 A1   Aug. 28, 2014

(30) Foreign Application Priority Data

Jan. 15, 2013   (IN) .......................... 139/MUM/2013

(51) Int. Cl.
 *G06F 17/27* (2006.01)
(52) U.S. Cl.
 CPC .................................. *G06F 17/27* (2013.01)
(58) Field of Classification Search
 USPC ........................................................... 704/9
 See application file for complete search history.

(56) References Cited

U.S. PATENT DOCUMENTS

| | | | |
|---|---|---|---|
| 8,402,027 B1* | 3/2013 | Dange .................. | G06K 9/6219 707/737 |
| 2005/0235266 A1 | 10/2005 | Oara et al. | |
| 2008/0104092 A1* | 5/2008 | Cummins .............. | G06Q 10/06 |
| 2008/0261701 A1* | 10/2008 | Lewin ..................... | G07F 17/32 463/43 |
| 2009/0327115 A1* | 12/2009 | Schilder ................ | G06F 17/278 705/35 |
| 2010/0031240 A1* | 2/2010 | Drumm ............. | G06F 17/30864 717/143 |
| 2010/0114628 A1* | 5/2010 | Adler ................... | G06Q 30/018 705/7.11 |
| 2010/0274543 A1* | 10/2010 | Walker ................... | G01V 99/00 703/6 |

OTHER PUBLICATIONS

Frederik Gailly et al., Ontology-Driven Business Rule Specification, Jan. 22, 2012, p. 1 and 2.

* cited by examiner

*Primary Examiner* — Shreyans A Patel
(74) *Attorney, Agent, or Firm* — Barnes & Thornburg LLP (57) ABSTRACT

The present subject matter relates to an automated classification of business rules. In one embodiment, a method for automated classification of the business rules comprises identifying a business rule from a text document, wherein the business rule comprises one or more rule intents. Further, the method comprises comparing the one or more rule intents in the business rule with rule intents associated with a plurality of rule types in a rule repository. Furthermore, the method comprises classifying the business rule under at least one of the rule types based on the comparison.

16 Claims, 7 Drawing Sheets

AUTOMATED CLASSIFICATION OF BUSINESS RULES FROM TEXT

PRIORITY CLAIM

This patent application claims priority to Indian Patent Application No. 139/MUM/2013, filed 15 Jan. 2013, the disclosure of which is incorporated herein by reference in its entirety.

TECHNICAL FIELD

The present subject matter relates, in general, to rule classification, and in particular, to automated classification of business rules from text.

BACKGROUND

Businesses have adopted Information Technology (IT) for automation from the early ages of computing. Starting with information storage, enterprises have adopted data processing, decision support systems, and automation packages like Enterprise Resource Planning (ERP) and Internet-delivered services. This has helped in improving the efficiency of the business processes and contributed to faster cycle times. A business process is typically a set of activities performed to achieve certain business objectives. Most of such activities are automated based on various business rules.

A business rule refers to one or more business conditions along with corresponding actions to be taken upon satisfaction of such business conditions. Business rules are used by almost all the business enterprises to serve one or more purposes, such as automation of business processes. Implementing business rules in a software application allows business processes to be automated. Generally, business rules are present in both formatted and un-formatted text documents including requirement documents, business agreements, charter documents, feature descriptions, guide books, technical specifications, and other project documents. The business rules are typically identified from such text documents, analyzed and then utilized for various purposes including the automation of business processes.

SUMMARY

This summary is provided to introduce concepts related to automated classification of business rules from text. These concepts are further described below in the detailed description. This summary is not intended to identify essential features of the claimed subject matter nor is it intended for use in determining or limiting the scope of the claimed subject matter.

In one embodiment, a method for automated classification of business rules from text comprises identifying a business rule from a text document, wherein the business rule comprises one or more rule intents The method further comprises comparing the one or more rule intents in the business rule with rule intents associated with a plurality of rule types in a rule repository. Based on the comparison, the business rule is classified under at least one of the rule types in the rule repository.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which.

DETAILED DESCRIPTION

Business rules encapsulate domain, system and business environment related knowledge in both formatted and un-formatted text documents including requirement documents, business agreements, charter documents, feature descriptions, guide books, technical specifications, and other project documents. The business rules are typically identified from such formatted and un-formatted text documents, analyzed and then utilized for the various purposes. One such purpose is the automation of various business processes. Various techniques exist for the automated identification of business rules from the text documents. However, classification of the business rules under different rule types has not been carried out conventionally.

Classification of business rules is significant for the development of various automated systems intended to automate various business processes. While designing such automated systems one needs to take into account different types of rules for making implementation specific decisions. For example, rules/constraints such as compliance to regulations of a country is deemed to be of a high priority from the business continuity angle, while data capture related rules may be important to an enterprise's internal policies. Further, configuring different types of products, especially, in the field of telecom, banking, insurance, etc., is a highly rules-driven exercise. An explicit, comprehensive and an efficient classification of the business rules embedded in various text documents and their representation in a reusable format has a significant value.

The present subject matter describes a method and a system for automated classification of business rules from text so that the business rules can be effectively referenced, traced, and reused in business processes. The text mentioned herein refers to formatted and un-formatted text documents including requirement documents, business agreements, charter documents, feature descriptions, guide books, technical specifications, and other project or business related documents.

According to an embodiment of the present subject matter, a rule repository is initially created for the purpose of classification of the business rules. To create rule repository, an administrator such as a domain expert identifiesthe business rules, and subsequently identifies rule intents present in the business rules based on manual content analysis of a training dataset comprising sample text documents. A rule intent may be understood as an atomic constraint that limits certain aspect of a system to be built. For example, a rule "In Europe, a person need to be above 18 years of age to get a driving license" has three rule intents: one that captures geography boundaries, one that captures age threshold, and one that limits the activity to driving.

For the identified rule intents, the administrator creates rule intent patterns. A rule intent pattern comprises one or more keywords, part-of-speech (POS) tags, and wild cards specifying occurrences of other possible words. The rule intent patterns thus created are thereafter utilized to automatically identify the business rules from the text documents. The rule intents and rule intent patterns are stored in the rule repository. In one implementation, the rule intents and rule intent patterns are stored in the form of an ontology (hereinafter referred to as a rule intent ontology) in the rule repository. In addition to the rule intents and the rule intent patterns, the business rules are also stored in the rule repository.

In one implementation, the rule intents stored in the rule repository are assembled into a plurality of clusters using conventionally known clustering algorithms. In an implementation, a Hierarchical clustering algorithm of agglomerative type is utilized for clustering rule intents that co-occur frequently in the business rules. After the creation of the clusters, rule types for the clusters are defined by the administrator. The rule types are then stored in the rule repository and the business rules are annotated with corresponding rule intents and rule types.

The rule repository can be periodically updated or enriched with new rule intents, rule intent patterns and rule types. In one implementation, subsequent to manual content analysis phase, an automated classifier, for example, a Bayesian classifier is run on the training dataset to classify each of the sentences obtained from the training dataset as a candidate rule or non-rule. The candidate rule is then matched with pre-identified rule intent patterns in the rule repository. If the candidate rule does not matches with any pre-identified rule intent patterns in the rule repository, an administrator is prompted to examine it manually to identify new rule intents and corresponding new rule intent patterns, if any. The newly defined rule intents and rule intent patterns are then incorporated in the rule repository. In said implementation, incorporation of new rule intents leads to formation of new clusters and new rule types.

According to one implementation of the present subject matter, the rule types in the rule repository are associated with various possible knowledge element types, system components, stakeholders, etc., based on manual content analysis. The knowledge element types referred herein may include business concepts, business process, use cases, etc. The system components may include application components or sub-systems of a large and/or complex system, and the stakeholders may be customers, end-users, and/or professionals or associates in an organization. Information about the association of the rule types with knowledge element types, system components and stakeholders can be stored in the rule repository and may be used for automatically associating the business rules extracted from text documents with corresponding knowledge element types, system components and stakeholders.

The rule repository, thus, created from the training dataset is then utilized for automated classification of the business rules from text documents. According to an embodiment, sentences present in a formatted and unformatted text document are extracted and then classified as a candidate rule or non-rule using a Bayesian classification technique. After the sentence is classified as a candidate rule, the sentence is tokenized and tagged using parts of speech (POS) tags. The POS structure combined with keywords in the sentence is then matched against all the pre-identified rule intent patterns in the rule repository. If the sentence contains at least one matching rule intent pattern, the sentence is identified as a business rule. As indicated previously, a business rule comprises rule intents. Once the business rule is identified, the rule intents present in the business rule are determined.

The rule intents in the business rule are then compared with the rule intents composing rule types stored in the rule repository. On the basis of the comparison, a match score of the business rule with respect to each of the rule types is computed. A match score is indicative of the number of rule intents of the business rule matching with the rule intents composing a rule type. Based on the match score, the business rule is annotated with one or more rule types in the rule repository.

The method and the system according to the present subject matter provides a comprehensive and an efficient classification of business rules from text documents and their representation in the form of the rule intent ontology. Further, the business rules can be associated with appropriate knowledge element types, system components, and stakeholders. Thus, the business rules can be effectively referenced, traced, and reused across requirement artifacts and systems documentations.

The following disclosure describes the method and the system for automated classification of business rules from text. While aspects of the described method and the system can be implemented in any number of different computing systems, environments, and/or configurations, embodiments for the classification of business rules are described in the context of the following exemplary method(s) and system(s).

Figure 1:
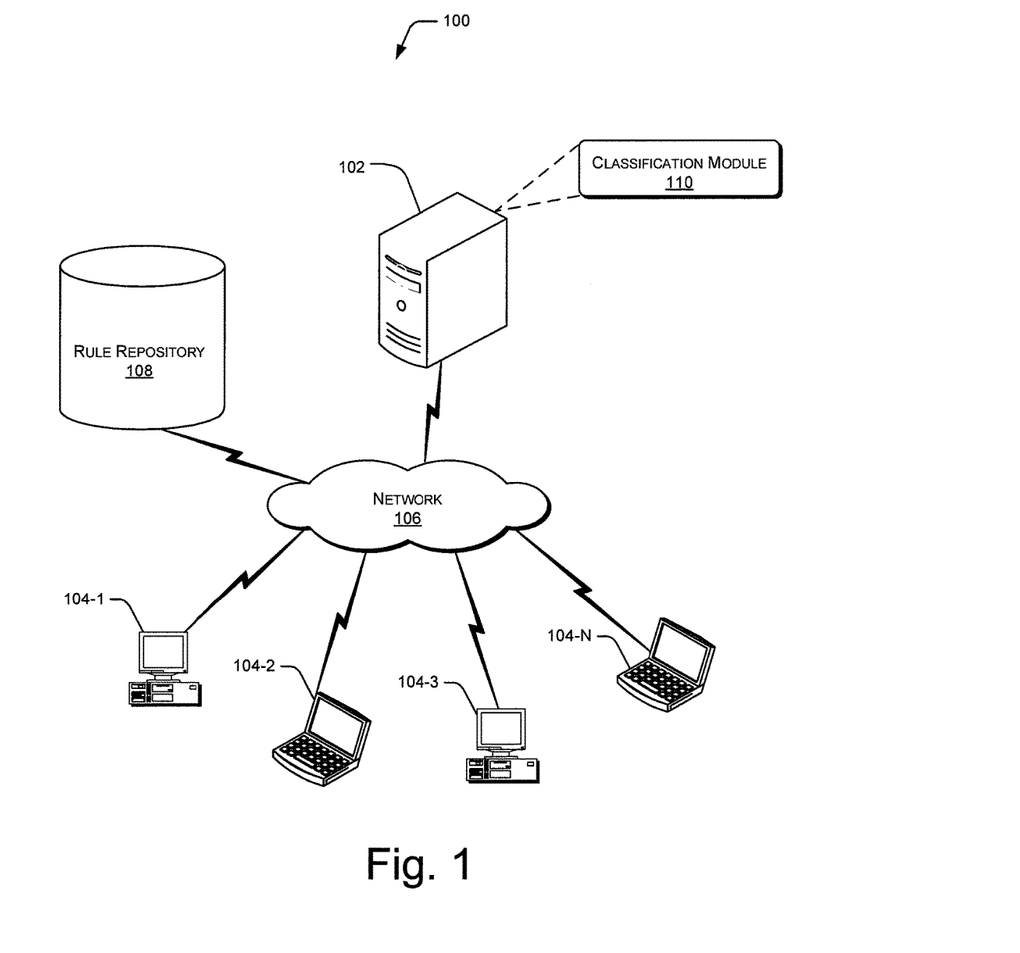
FIG. 1 illustrates a network environment implementing a business rule classification system, according to an embodiment of the present subject matter.

FIG. 1 illustrates a network environment 100 implementing a business rule classification system 102, in accordance with an embodiment of the present subject matter.

In one implementation, the network environment 100 can be a public network environment, including thousands of personal computers, laptops, various servers, such as blade servers, and other computing devices. In another implementation, the network environment 100 can be a private network environment with a limited number of computing devices, such as personal computers, servers, laptops, and/or communication devices, such as mobile phones and smart phones.

The business rule classification system 102 (hereinafter referred to as system 102) is communicatively connected to a plurality of user devices 104-1, 104-2, 104-3 . . . 104-N, collectively referred to as user devices 104 and individually referred to as a user device 104, through a network 106. In one implementation, a plurality of users may use the user devices 104 to communicate with the system 102. The system 102 is further connected to a rule repository 108 for storing rule intents, rule intent patterns, and rule types therein. In one implementation, the rule repository 108 can be implemented as an external repository (as shown in the FIG. 1) communicatively connected to the system 102 through the network 106. In another implementation, the rule repository 108 can be implemented as an internal repository within the system 102.

The system 102 and the user devices 104 may be implemented in a variety of computing devices, including, servers, a desktop personal computer, a notebook or portable computer, a workstation, a mainframe computer, a laptop and/or communication device, such as mobile phones and smart phones. Further, in one implementation, the system 102 may be a distributed or centralized network system in which different computing devices may host one or more of the hardware or software components of the system 102.

The system 102 may be connected to the user devices 104 over the network 106 through one or more communication links. The communication links between the system 102 and the user devices 104 are enabled through a desired form of communication, for example, via dial-up modem connections, cable links, digital subscriber lines (DSL), wireless, or satellite links, or any other suitable form of communication.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, for providing a link between the system 102 and the user devices 104. The network devices within the network 106 may interact with the system 102, and the user devices 104 through the communication links.

According to the present subject matter, the system 102 obtains a text document from a plurality of data sources, such as repositories within the enterprise, emails, blogs, or other enterprise websites or forum. Alternatively, the system 102 obtains a text document from a user, such as a business analyst. The system 102 then extracts sentences present in a text document and classifies each of the sentences either as a candidate rule or a non-rule. The system 102, for example, utilizes a Bayesian classification technique for classifying the sentence as the candidate rule or non-rule. If the sentence is classified as the candidate rule, the sentence is tokenized by the system 102 and the tagged using parts of speech (POS) tags. The POS tags combined with keywords in the candidate rule represents a syntactic structure of the candidate rule. The system 102 compares the syntactic structure of the candidate rule with the pre-identified rule intent patterns in the rule repository to determine if any matching rule intent pattern is found. If the candidate rule is found to contain any matching rule intent pattern, the system 102 identifies the candidate rule as a business rule. However, if the candidate rule does not matches with any rule intent pattern, the system 102 discards the candidate rule.

Once the business rule is identified, the system 102 determines the rule intents present in the business rule. The system 102, in one implementation, stores the rule intents into the rule repository 108. According to an implementation of the present subject matter, the system 102 includes a classification module 110, which is configured to compare the rule intents in the business rule with rule intents composing a plurality of rule types in the rule repository 108. On the basis of the comparison, a match score is computed, for the business rule, by the classification module 110. The match score is indicative of number of rule intents of the business rule matched with the rule intents composing the rule type. In an example, a match score 2 indicates two rule intents of the business rule matching with the two rule intents of a given rule type.

Based on the match score, the classification module 110 classifies the business rule under one or more matching rule types in the rule repository 108. The business rules and its rule intents can be thereafter annotated with the matching rule types in the rule repository 108. The manner in which the automated classification of the business rules takes place is explained in greater detail according to the FIG. 2(a).

Figure 2A:
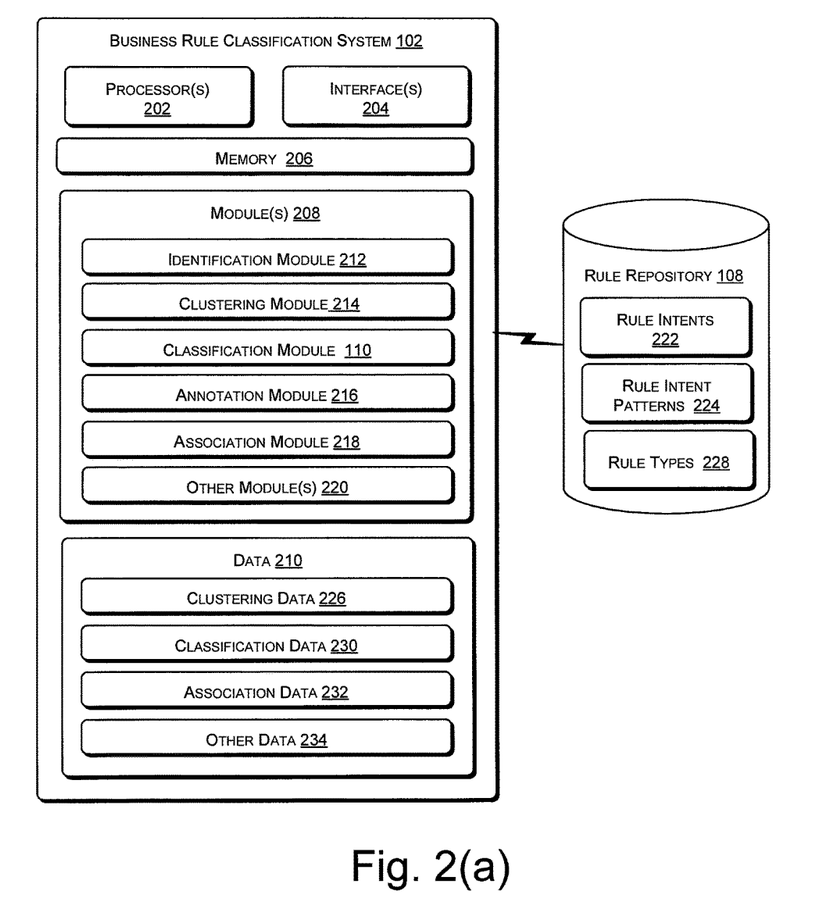
FIG. 2(a) illustrates components of the business rule classification system, according to an embodiment of the present subject matter.

FIG. 2(a) illustrates various components of the system 102, according to an embodiment of the present subject matter.

In said embodiment, the system 102 includes one or more processor(s) 202, interfaces 204, and a memory 206 coupled to the processor(s) 202. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions and data stored in the memory 206.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

The interface(s) 204 may include a variety of software and hardware interfaces, for example, interface for peripheral device(s), such as a keyboard, a mouse, an external memory, and a printer. Further, the interface(s) 204 may enable the system 102 to communicate over the network 106, and may include one or more ports for connecting the system 102 with other computing devices, such as web servers and external databases. The interface(s) 204 may facilitate multiple communications within a wide variety of protocols and networks, such as a network, including wired networks, e.g., LAN, cable, etc., and wireless networks, e.g., WLAN, cellular, satellite, etc.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The system 102 also includes module(s) 208 and data 210.

The module(s) 208 include routines, programs, objects, components, data structures, etc., which perform particular tasks or implement particular abstract data types. The module(s) 208 further include, in addition to the classification module 110, an identification module 212, a clustering module 214, an annotation module 216, an association module 218, and other module(s) 220.

The data 210 serves, amongst other things, as a repository for storing data processed, received and generated by one or more of the modules 208. The data 210 includes clustering data 226, classification data 230, association data 232, and other data 234. The other data 234 includes data generated as a result of the execution of the other module(s) 220.

According to the present subject matter, a rule repository 108 is created by an administrator such as a domain expert, for the classification of the business rules. To create rule repository 108, the administrator identifies the business rules from text documents, and determines rule intents present in the business rules based on manual content analysis of the training dataset. The administrator then creates rule intent patterns for the identified rule intents. As indicated previously, the rule intent patterns are composed of one or more keywords, part-of-speech (POS) tags, and wild cards specifying occurrences of other possible words.

Figure 2B:
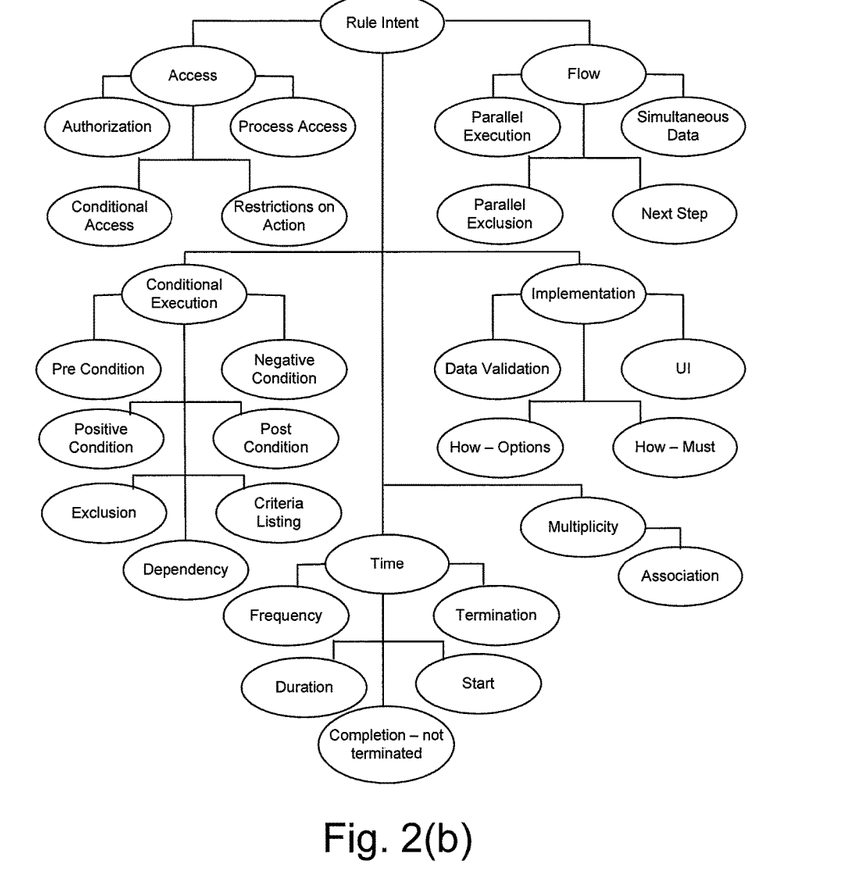
FIG. 2(b) illustrates an exemplary rule intent ontology depicting rule intents captured as concepts and hierarchical associations of the concepts.

In one implementation, the rule intents are stored in a form of a rule intent ontology in the rule repository 108. An exemplary rule intent ontology is depicted in FIG. 2(b). As shown in the FIG. 2(b), the rule intent ontology comprises rule intents represented as different concepts in the rule intent ontology along with their hierarchical associations with other concepts, i.e., other rule intents.

Apart from the rule intents and the rule intent patterns, the business rules are also stored in the rule repository 108. After the manual content analysis, the identification module 212 of the system 102 is configured to identify business rules based on rule intents and rule intent patterns from the training dataset. The training dataset mentioned herein refers to sample text sentences or sample text documents. The identification module 212, for example, extracts the sentences present in the training dataset. Once extracted, the identification module 212 classifies each of the sentences present in the training dataset either as a candidate rule or a non-rule using a Bayesian classification technique.

According to the Bayesian classification technique, the sentence is classified as a candidate rule or a non-rule based on calculating the Bayesian probability of the sentence to be a candidate rule. The probability is calculated, for example, based on the patterns such as "should not", "may not", "must not", "must", "should", "will be", "will only be", "within", "up to", "ensure", etc., corresponding to candidate rules, and the patterns such as "switch", "tab", "screen", "clicks", "enters", "window", etc., corresponding to non-rules. If the probability value of a sentence is greater than a predefined threshold, say, 0.5, the identification module 212 classifies the sentence as the candidate rule. Otherwise, the identification module 212 classifies the sentence as non-rule and subsequently discards the sentence.

The identification module 212 is then configured to tokenize and tag the candidate rule using POS tags. Thereafter, the identification module 212 is configured to compare a syntactic structure of the candidate rule with a plurality of rule intent patterns stored in the rule repository 108. The syntactic structure of the candidate rule includes keywords and parts of speech (POS) tags. Further, the rule-intent patterns are also composed of combination of keywords, parts of speech (POS) tags, and wild card characters ('*', '+', '.') specifying occurrences of other possible words. If a matching rule intent pattern is found in the candidate rule, the identification module 212 identifies the candidate rule as the business rule. Subsequently, the identification module 212 identifies rule intents present in the business rule. In one implementation, if no matching rule intent pattern is found in the candidate rule, the identification module 212 discards the candidate rule. In another implementation, if no matching rule intent pattern is found in the candidate rule, an administrator is prompted to examine it manually to identify new rule intents and new rule intent patterns, if any, which are then incorporated in the rule repository 108. The identification module 212 stores the information about rule intents present in the business rule in the rule repository 108.

An exemplary set of rule intents and their corresponding rule intent patterns are shown in the table 1 provided below.

TABLE 1

| Rule Intent | Rule Intent Patterns |
| --- | --- |
| Parallel Execution | * MD also VB * |
|  | * along with * |
|  | * as well as * |
|  | * simultaneously * |
|  | * in parallel * |
| Duration | * MD VB * quarterly * |
|  | * within * biweekly * |
|  | * later * date * |
|  | * annually * less * |
| Data Validation | Check * |
|  | Ensure * |
|  | TO VB * NN * VBZ * |
|  | * VBZ required * |

Figure 2C:
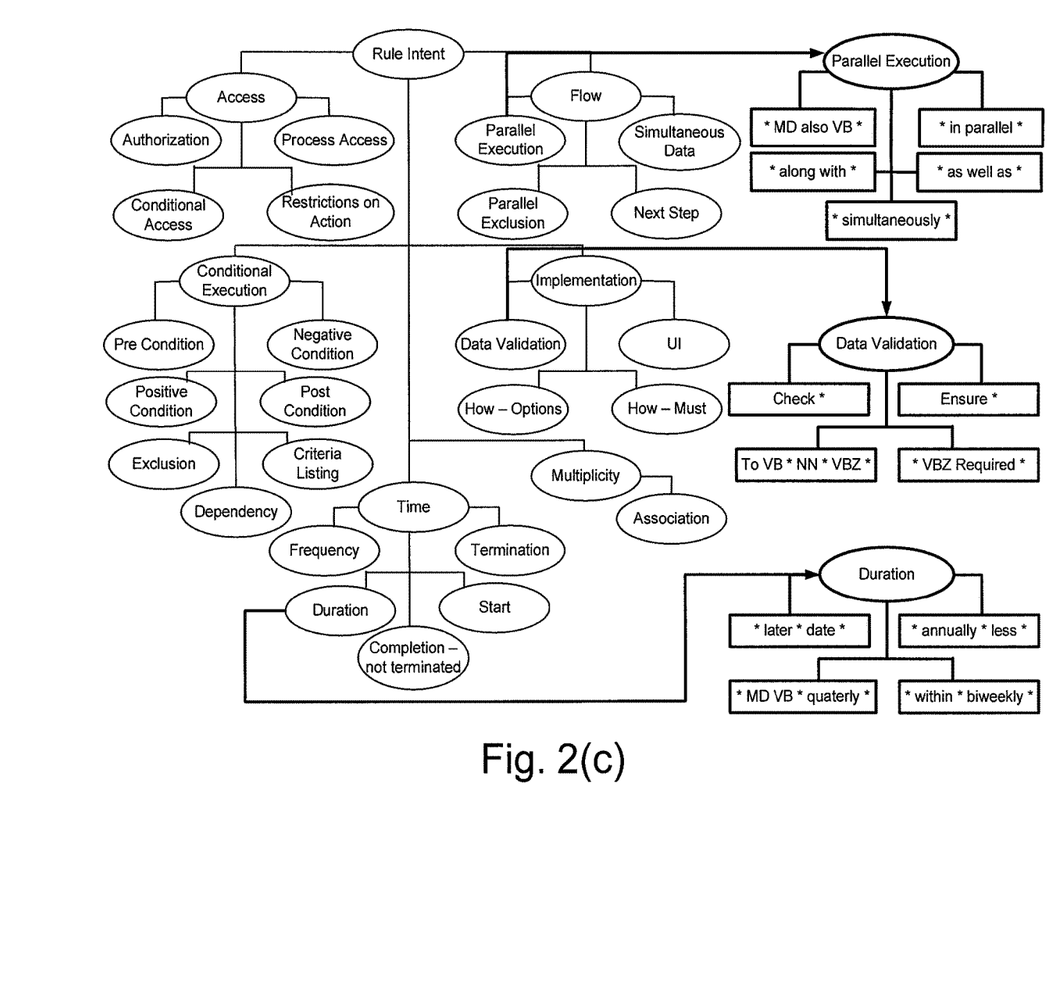
FIG. 2(c) illustrates the exemplary rule intent ontology depicting rule intent patterns associated with rule intents.
Figure 2D:
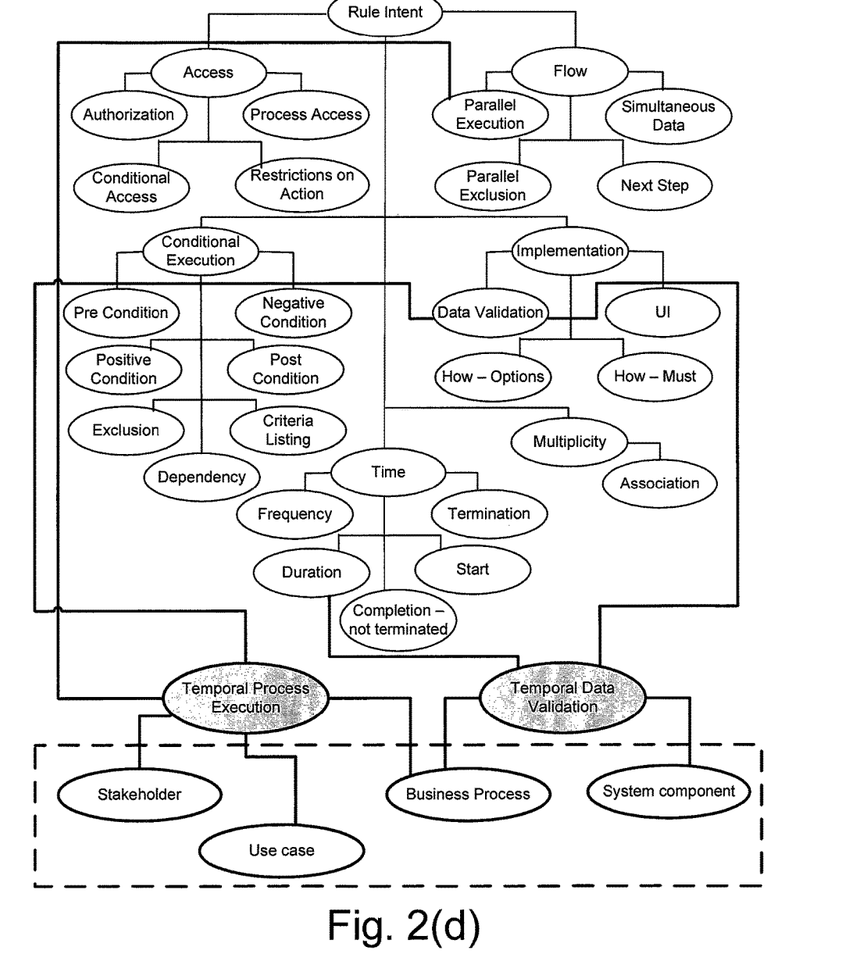
FIG. 2(d) illustrates the exemplary rule intent ontology depicting rule intents, rule types and associated knowledge element types, system components and stakeholders.

The above mentioned rule intents and rule intent patterns are further depicted in the FIG. 2(c).

Subsequent to the identification of the rule intents based on the manual content analysis and the automated identification, the identified rule intents are clustered in a plurality of clusters by the clustering module 214. The clustering module 214, for example, clusters the rule intents using conventionally known clustering algorithms. In one implementation, the clustering module 214 utilizes a Hierarchical clustering algorithm of agglomerative type for clustering rule intents that co-occur frequently in the business rule. In one implementation, the clustering module 214 may store the clusters within the clustering data 226.

Subsequent to the creation of the clusters, a rule type for each cluster may be defined by an administrator, such as a business analyst or a domain expert. The mechanism to come up with rule types is unsupervised learning technique where rule intents are used to form clusters, and the clusters are assigned with rule types. The rule intents, rule intent patterns, and rule types thus obtained are stored in the rule repository 108, as rule intents 222, rule intent patterns 224, and rule types 228, respectively. The rule repository 108, therefore, includes rule types, rule intents and rule intent patterns corresponding to the business rules.

The rule repository 108 thus created is referred to by the system 102 for extraction and classification of the business rules from text documents (excluding the training dataset). Once a new business rule is identified from a text document, the identification module 212 identifies the rule intents present in the business rule. Further, the classification module 110 of the system 102 compares the rule intents of the business rule with rule intents composing rule types in the rule repository 108. On the basis of the comparison, a match score for the business rule with respect to each of the rule types is computed. As indicated previously, a match score for a business rule with respect to a rule type is indicative of number of rule intents of the business rule matching with rule intents of the rule type. For example, a match score may be 1 if one rule intent of the business rule matches with one rule intent of a rule type.

In one implementation, if the number of rule intents matched is greater than 0, i.e., even if a single rule intent of a given business rule is matched with a rule type, the business rule is classified into the rule type, and the information about the number of rule intents matched is stored in the rule repository 108. In another implementation, a match threshold may be defined by the administrator. In said implementation, the classification module 110 classifies a business rule under a rule type, only if the match score is equal to or above the match threshold. Subsequent to the classification, the annotation module 216 is configured to annotate the rule intents present in the business rule with matching rule intents and corresponding rule types in the rule repository 108.

The classification module 110 performs such a classification process for all the business rules to classify the business rules under corresponding rule types. Further, the classification module 110 triggers the annotation module 216 to highlight the business rules in the text document and to annotate the business rules with corresponding rule intents and rule types in the rule repository 108. In one implementation, the classification module 110 may store information related to the classification within the classification data 230.

The process of identifying the business rule is now explained with reference to an exemplary text document containing following sentences: "The date of loss (DOL) should fall within the policy period. The DOL should be within the date of expiry stated in an endorsement if there is one which has the effect of changing the date of expiry of the policy. In the absence of such an endorsement, the loss date should be within the date of expiry stated in the policy."

According to said example, the identification module 212 classifies each of the above mentioned sentences as a candidate rule or non-rule based on a Bayesian classification technique. For the sentences that are classified as the candidate rule, the identification module 212 is configured to compare the syntactic structure of the candidate rule with rule intent patterns stored in the rule repository 108. On the basis of the comparison, if a matching rule intent pattern is found to be present in the candidate rule, the candidate rule is identified to be a business rule. Once the business rule is identified, the rule intents present in the business rule are determined by the identification module 212.

According to said example, each of the sentences mentioned above are classified as a candidate rule based on the Bayesian classification technique. A syntactic structure of each of the above mentioned sentences is as follows: "The/DT date/NN of/IN loss/NN (/(DOL/NNP)/) should/MD fall/VB within/IN the/DT policy/NN period/NN ./. The/DT DOL/NNP should/MD be/VB within/INthe/DTdate/NN of/IN expiry/NN stated/VBN in/IN an/DT endorsement/NN if/IN there/EX is/VBZ one/CD which/WDT has/VBZ the/DT effect/NN of/IN changing/VBG the/DT date/NN of/IN expiry/NN of/IN the/DT policy/NN ./. In/IN the/DT absence/NN of/IN such/JJ an/DT endorsement/NN ,/, the/DT loss/NN date/NN should/MD be/VB with in/INthe/DTdate/NN of/IN expiry/NN stated/VBN in/IN the/DT policy/NN".

The identification module 212 compares the syntactic structure of each of the candidate rules with the rule intent patterns stored in the rule repository 108 to identify if one or more matching rule intent pattern are found in the candidate rules. Table 2 provided below depicts the rule intent patterns in the rule repository 108 that are found to be present in the candidate rules. Since the matching rule intent patterns are found, the identification module 212, identifies the candidate rules as the business rules. Accordingly, the rule intents present in the business rule corresponding to the matching rule intent patterns are identified. Table 2 also depicts the identified rule intents corresponding to the matching rule intent patterns.

TABLE 2

| Rule intent | Rule intent patterns |
| --- | --- |
| Data Validation | * MD VB within * |
| Duration | * MD VB * date * |
|  | * date * MD VB * |
|  | * within * date * |
|  | * date * within * |

In one implementation, the association module 218 of the system 102 is configured to identify associations of the business rule with possible knowledge element types, system components and stakeholders, based on the rule types under which the business rule is classified. The knowledge element types referred herein may include business processes, use cases, etc. The system components may include application components or sub-systems of a large and/or complex system, and the stakeholders may be customers, end-users, and/or professionals or associates in an organization. In one implementation, the association module 218 stores the data related to the association within the association data 232.

Initially, the administrator such as a domain expert associates each of the rule types in the rule repository 108 with appropriate knowledge element types, system components, and stakeholders, based on manual content analysis. In an example, a screen data validation rule type may be associated with a knowledge element such as a use case executed on a GUI. A rule type such as process execution may be typically associated with business processes, whereas access rules may be associated either with stakeholders or authorization components in a system. Based on this association of the rule types with different knowledge element types, system components, and stakeholders, the association module 218 is configured to identify associations of the business rule with possible knowledge element types, system components and stakeholders based on the rule type(s) under which the business rule is classified. In an example, if the business rule is classified under a rule type 'screen data validation', which is associated with knowledge element types 'use case', which is executed on a GUI and a 'business process', the association module 218 identifies the 'use case' and the 'business process' as associations of the business rule. Subsequently, the association module 218 triggers the annotation module 216 to annotate the business rule with its corresponding associations. In the example cited above, the annotation module 216 annotates the business rule with the 'use case' and the 'business process'. In an implementation, guidance related to association of the business rules with corresponding knowledge element types, system components and stakeholders can be provided to an end user.

FIG. 2 (d) illustrates an exemplary rule intent ontology in the rule repository 108 depicting the mapping of the rule intents "parallel execution" and "data validation" with "temporal process execution", and the mapping of the rule intents "duration" and "data validation" with "temporal data validation". Further, FIG. 2(d) depicts the association of the "temporal process execution" with a "stakeholder", a "use case", and a "business process", and the "temporal data validation" with the "business process" and a "system component".

Figure 2E:
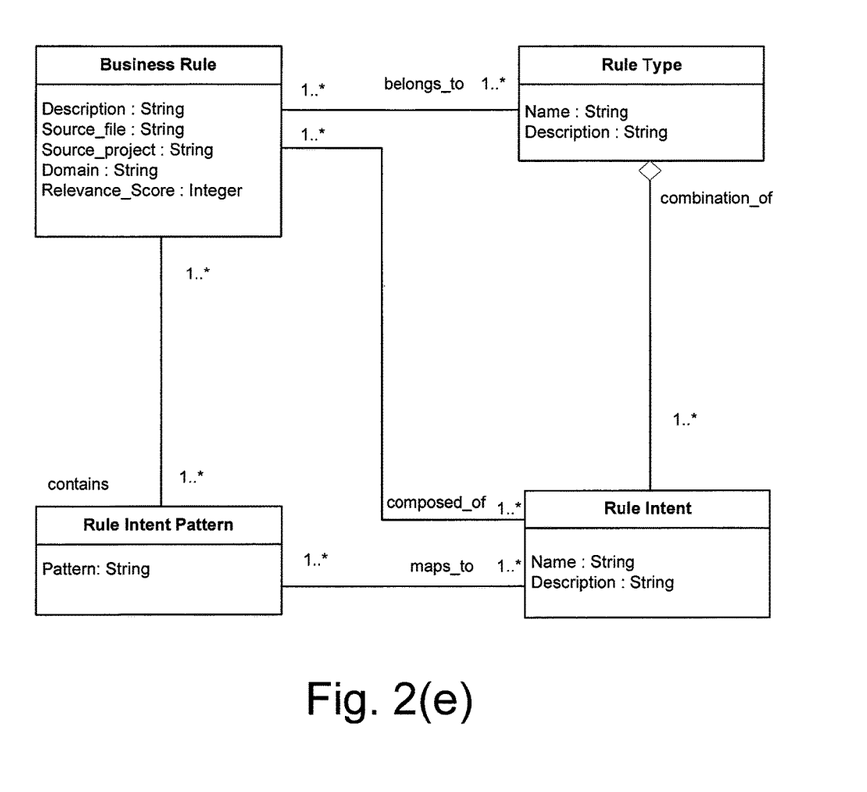
FIG. 2(e) illustrates a class diagram of a rule repository, according to an embodiment of the present subject matter.

In one implementation, a class diagram of the rule repository 108 is depicted in the FIG. 2(e). As shown in the FIG. 2(e), the business rules, rule intents, rule intent patterns, and the rule types in the rule repository 108, and their associations with one another are shown in the form of a class diagram.

Figure 3:
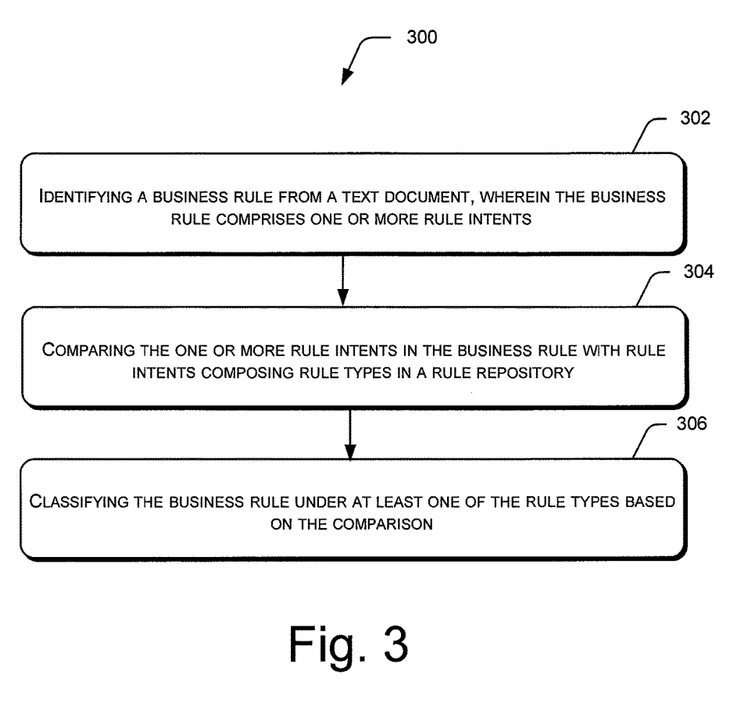
FIG. 3 illustrates a method for automated classification of business rules from text, according to an embodiment of the present subject matter.

FIG. 3 illustrates a method 300 for automated classification of business rules from text, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300, or alternative methods. Additionally, individual blocks may be deleted from the methods without departing from the spirit and scope of the subject matter described herein. Furthermore, the method 300 can be implemented in any suitable hardware, software, firmware, or combination thereof.

Referring to FIG. 3, at block 302, the method 300 includes identifying a business rule from a text document, wherein the business rule comprises one or more rule intents. In one implementation, each of the sentences present in the text document is classified either as a candidate rule or a non-rule using a Bayesian classification technique. The candidate rule is processed further, while the non-rule is discarded. The further processing involves comparing syntactic structure of the candidate rule with a plurality of pre-identified ruleintent patterns in a rule repository 108. On the basis of the comparison, if one or more matching rule intent patterns are found in the candidate rule, the candidate rule is identified as a business rule. Else, the candidate rule is discarded or an administrator can be prompted to identify new rule intents and new rule intent patterns, if any. In one implementation, the identification module 212 of the system 102 identifies the business rules from a text document.

At block 304, the method 300 includes comparing the rule intents in the business rule with rule intents composing rule types present in a rule repository 108. On the basis of the comparison, a match score is computed. The match score indicates, for example, the number of rule intents in the business rule that matches with the rule intents of a rule type in the rule repository 108. In one implementation, the classification module 110 of the system 102 compares the rule intents in the business rule with the rule intents composing rule types in the rule repository 108 and computes the match score.

At block 306, the method 300 includes classifying the business rule under one or more rule types based on the comparison performed at the previous block. For example, the classification of the business rule is performed based on the match score. In one implementation, the classification module 110 classifies the business rule under the one or more rule types. Subsequently, the annotation module 216 highlights the business rule in the text document and annotates the rule intents present in the business rule with the matching rule types.

According to an implementation of the present subject matter, the rule types in the rule repository 108 are associated with various possible knowledge element types, system components, and stakeholders, by a domain expert. The knowledge element types referred herein may include business processes, use cases, etc. The system components may include application components or sub-systems of a large and/or complex system, and the stakeholders may be customers, end-users, and/or professionals or associates in an organization. Information about this association is then used for associating the business rules identified from the text documents with corresponding knowledge element types, system components and stakeholders. In one implementation, the association module 218 is configured to identify associations of the business rule with possible knowledge element types, system components and stakeholders based on the rule type(s) under which the business rule is classified. The association module 218 then triggers the annotation module 216, which is configured to annotates the business rule with identified associations.

Although embodiments for the automated classification of business rules from text have been described in language specific to structural features and/or methods, it is to be understood that the invention is not necessarily limited to the specific features or methods described. Rather, the specific features and methods are disclosed as exemplary implementations for the automated classification of business rules from text.

We claim:

1. A processor implemented method for automated classification of business rules from text, the method comprising:

identifying, via one or more hardware processors, a business rule from a text document, wherein the business rule comprises one or more rule intents, wherein one or more rule intent comprise at least one of keywords, parts of speech (POS) tags, and wildcards and said one or more rule intents are utilized to automatically identify the business rule from the text document;

creating, via the one or more hardware processors, a rule repository based on an identified business rule and the one or more rule intents, wherein the rule intents are atomic constraints stored in an ontology form to automatically identify the business rule from the text document;

comparing, via the one or more hardware processors, the one or more rule intents in the business rule with the one or more clusters associated with a plurality of rule types in the rule repository to compute a match score, wherein a match score is indicative of number of rule intents and based on the match score, the business rule is annotated with one or more rule types in the rule repository, and wherein the rule repository is periodically updated with a plurality of new rule intents, said rule intent patterns and new rule types;

classifying, via the one or more hardware processors, the business rule under at least one rule type, amongst the plurality of rule types, to further classify the business rule into at least one of formatted and unformatted text documents for referring and tracing the text document by annotating the business rule with one or more corresponding rule intents and one or more rule types in the rule repository;

clustering, via the one or more hardware processors, said plurality of new rule intents in an agglomerative manner to identify one or more clustering rule intents that co-occur frequently in the rule repository;

assembling, via the one or more hardware processors, the one or more clusters into a plurality of clustering techniques, wherein the rule repository is periodically updated with the corresponding rule intent and the rule type to classify sentences obtained from a training dataset; and automatically associating, via the one or more hardware processors, the business rules extracted from the text document with a plurality of corresponding knowledge element types and system components to reference, trace and re-use at least one of requirement artifacts and system documentation.

2. The processor implemented method as claimed in claim 1, wherein the identifying comprises:
extracting a sentence from a text document;
classifying the extracted sentence as one of a candidate rule and a non-rule based on a Bayesian classification technique; and
comparing a syntactic structure of the candidate rule with a plurality of rule intent patterns in the rule repository to identify the candidate rule as the business rule.

3. The processor implemented method as claimed in claim 1, wherein the method further comprising clustering the rule intents into one or more clusters based on a clustering algorithm, wherein each of the one or more clusters is assigned a rule type, amongst the plurality of rule types, by a domain expert.

4. The processor implemented method as claimed in claim 1, wherein the rule intents, the plurality of rule intent patterns, and the plurality of rule types are stored in a rule repository in form of a rule intent ontology.

5. The processor implemented method as claimed in claim 1, wherein the method further comprises associating each of the plurality of rule types in the rule repository to one or more knowledge element types, system components, and stakeholders.

6. A computer implemented system comprising:
a memory storing instructions;
one or more communication interfaces;
one or more hardware processors, coupled to said memory using said one or more interfaces;
an identification module coupled to the processor, wherein the identification module is configured to identify a business rule in a text document and token size and tag a candidate rule using part-of-speech (POS) tags, wherein the business rule comprises one or more rule intents;
the identification module configured to a rule repository based on an identified business rule and the one or more rule intents, wherein the rule intents are atomic constraints stored in an ontology form
a classification module, coupled to the processor, wherein the classification module is configured to:
compare, the one or more rule intents in the business rule with the one or more clusters associated with a plurality of rule types in the rule repository to compute a match score, wherein the match score is indicative of the number of rule intents and based on the match score, the business rule is annotated with one or more rule types in the rule repository, and wherein the rule repository is periodically updated with a plurality of new rule intents, said rule intent patterns and new rule types;
classify the business rule under at least one rule type, amongst the plurality of rule types, based on the match score to further classify the business rule into at least one of formatted and unformatted text documents for referring and tracing the text document by annotating the business rule with one or more corresponding rule intents and one or more rule types in the rule repository;

trigger an annotation module to highlight the business rule in a document and to annotate the business rule with at least one of the one or more rule intents and rule types in the rule repository;
cluster the one or more rule intents in an agglomerative manner to identify one or more clustering rule intents that co-occur frequently in the rule repository;
assemble the one or more clusters into a plurality of clustering techniques, wherein the rule repository is periodically updated with the corresponding rule intent and the rule type to classify sentences obtained from a training data set; and
automatically associate the business rules extracted from the text document with a plurality of corresponding knowledge element types and system components to reference, trace and re-use at least one of requirement artifacts and system documentation.

7. The computer implemented system as claimed in claim 6, wherein the business rule classification system further comprises a clustering module configured to cluster the rule intents into one or more clusters based on a clustering algorithm, wherein each of the one or more clusters is assigned a rule type, amongst the plurality of rule types.

8. The computer implemented system as claimed in claim 6, wherein the business rule classification system further comprises an annotation module configured to highlight the business rule in the text document and annotate the one or more rule intents in the business rule with the at least one rule type.

9. The business rule classification system as claimed in claim 6, wherein the identification module is configured to identify the business rule from the text document based on extracting a sentence from the text document, and calculating a Bayesian probability of the extracted sentence to be a candidate rule.

10. The computer implemented system as claimed in claim 9, wherein the identification module is further configured to compare a syntactic structure of the candidate rule with a plurality of rule intent patterns in the rule repository to identify the candidate rule as the business rule.

11. The computer implemented system as claimed in claim 6, wherein the business rule classification system further includes an association module configured to identify associations of the business rule with knowledge element types, system components, and stakeholders based on the at least rule type under which the business rule is classified.

12. The computer implemented system as claimed in claim 11, wherein the business rule classification system further comprises an annotation module configured to annotate the business rule with the identified associations.

13. A non-transitory computer-readable medium having embodied thereon a computer program for executing a method comprising:
identifying, a business rule from a text document, wherein the business rule comprises one or more rule intents, wherein one or more rule intent comprise at least one of keywords, parts of speech (POS) tags, and wildcards and said one or more rule intents are utilized to automatically identify the business rule from the text document;
creating, via the one or more hardware processors, a rule repository based on an identified business rule and the one or more rule intents, wherein the rule intents are atomic constraints stored in an ontology form;
comparing, the one or more rule intents in the business rule with the one or more clusters associated with a plurality of rule types in the rule repository to compute a match score, wherein a match score is indicative of number of rule intents and based on the match score, the business rule is annotated with one or more rule types in the rule repository, and wherein the rule repository is periodically updated with a plurality of new rule intents, said rule intent patterns and new rule types;

classifying, the business rule under at least one rule type, amongst the plurality of rule types, to further classify the business rule into at least one of formatted and unformatted text documents for referring and tracing the text document by annotating the business rule with one or more corresponding rule intents and one or more rule types in the rule repository;

clustering, said plurality of new rule intents in an agglomerative manner to identify one or more clustering rule intents that co-occur frequently in the rule repository;

assembling, the one or more clusters into a plurality of clustering techniques, wherein the rule repository is periodically updated with the corresponding rule intent and the rule type to classify sentences obtained from a training dataset; and automatically associating, via the one or more hardware processors, the business rules extracted from the text document with a plurality of corresponding knowledge element types and system components to reference, trace and re-use at least one of requirement artifacts and system documentation.

14. The non-transitory computer-readable medium as claimed in claim 13, wherein the identifying comprises:
extracting a sentence from a text document;
classifying the extracted sentence as one of a candidate rule and a non-rule based on a Bayesian classification technique; and
comparing a syntactic structure of the candidate rule with a plurality of rule intent patterns in the rule repository to identify the candidate rule as the business rule.

15. The non-transitory computer-readable medium as claimed in claim 13, wherein the classifying comprises annotating the one or more rule intents in the business rule with the at least one rule type.

16. The non-transitory computer-readable medium as claimed in claim 13, wherein the method further comprises associating each of the plurality of rule types in the rule repository to one or more knowledge element types, system components, and stakeholders.

* * * * *